United States Patent [19]

Rayfield et al.

[11] Patent Number: 4,835,195
[45] Date of Patent: May 30, 1989

[54] DRY GROUND/WET GROUND CALCIUM CARBONATE FILLER COMPOSITIONS

[76] Inventors: Jerry W. Rayfield, One Maple Rd., Sylacauga, Ala. 35150; Robert A. Baker, 4311 Revere, Marietta, Ga. 30062; Kenneth E. Weber, 881 Chattanooga Ave., Palisades, Calif. 90272

[21] Appl. No.: 231,391

[22] Filed: Aug. 12, 1988

[51] Int. Cl.⁴ .................................................. C08K 7/00
[52] U.S. Cl. ..................................... 523/220; 106/464; 523/440; 524/425; 524/567; 524/570; 524/581; 524/590
[58] Field of Search ................ 106/464; 523/220, 440; 524/425, 567, 581, 590, 570

[56] References Cited

U.S. PATENT DOCUMENTS

| | | | |
|---|---|---|---|
| 4,187,210 | 2/1980 | Howard, Jr. .......................... | 523/220 |
| 4,595,715 | 6/1986 | Kurze .................................... | 523/220 |
| 4,598,105 | 7/1986 | Weber et al. ......................... | 523/220 |
| 4,707,504 | 11/1987 | Walkowiak et al. ................ | 523/220 |

Primary Examiner—Morton Foelak
Attorney, Agent, or Firm—Klauber & Jackson

[57] ABSTRACT

Novel finely divided particulate calcium carbonate compositions comprising mixtures of a preponderance of dry ground calcium carbonate with a smaller amount of wet ground calcium carbonate, each of these components having particular particle size characteristics and particle size distributions, are disclosed. When used as all or part of the filler in thermosetting and thermoplastic resinous compositions, e.g., thermosetting polyester resinous molding compositions, paints and other finishes, sealants and the like, such mixtures provide compositions having high filler loadings coupled with acceptably low viscosities and better processability than resinous compositions containing all dry-ground fillers.

17 Claims, 4 Drawing Sheets

SEDIGRAPH PARTICLE SIZE DISTRIBUTION
NO. 1 WHITE (TYPICAL SAMPLE)

FIG. 1
SEDIGRAPH PARTICLE SIZE DISTRIBUTION
NO. 1 WHITE (TYPICAL SAMPLE)

FIG. 2
SEDIGRAPH PARTICLE SIZE DISTRIBUTION
OPACIMITE (TYPICAL SAMPLE)

DRY GROUND/WET GROUND CALCIUM CARBONATE FILLER COMPOSITIONS

FIELD OF THE INVENTION

This invention relates to novel finely divided particulate calcium carbonate compositions. More particularly, this invention relates to novel finely divided particulate calcium carbonate compositions especially suited for use as fillers in thermosetting and thermoplastic resinous molding compositions, paints and other finishes, sealants and the like. These novel compositions comprise mixtures of a preponderance of dry ground calcium carbonate with a smaller amount of wet ground calcium carbonate, each of these components having particular particle size characteristics and particle size distributions. When used as all or part of the filler in thermosetting and thermoplastic resinous compositions such mixtures provide compositions having high filler loadings (low resin demand) coupled with acceptably low viscosities (and consequently better wetting of any other fillers present, such as glass fibers or the like) and better processability, properties usually obtainable only by using more expensive processing methods to prepare all wet-ground calcium carbonate filler compositions.

BACKGROUND OF THE INVENTION

Non-platy minerals such as calcium carbonate, calcium sulfate, barium sulfate and the like which have been treated to produce particles having, in the aggregate, relatively high surface areas are known to be useful as fillers for various thermosetting and thermoplastic resinous compositions. Such fillers are primarily extenders rather than reinforcing fillers and can be used alone or mixed with other fillers, including reinforcing fillers such as talc, glass fibers and the like.

U.S. Pat. No. 4,257,817, issued March 24, 1981 to Mathur et al, discloses inorganic fillers having reduced binder demand for use in thermosetting and thermoplastic resin formulations. Mathur et al's fillers are prepared by a method which involves subjecting the filler to the high intensity rotary impact agitation of a blade rotating at a peripheral speed of from about 20 to 60 meters per second. The patentees make passing reference to:

"(p)ast attempts at reducing the binder demand of inorganic fillers [which] have included such approaches as alteration of the particle size distribution of the filler to minimize its void volume, compaction techniques and surface coating of the filler", col 1, lines 30-37. No further details appear, however, regarding such approaches, nor are the particle size characteristics or particle size distributions of these reduced binder demand fillers given in the Mathur et al patent.

An article by Fekete et al entitled "A Study of the Influence of Specific Variables on Viscosity Relationships and Surface Properties of Sheet Molding Compound [SMC] Formulations Based on Special Calcium Carbonate Fillers" from the proceedings of the 32nd Annual Technical Conference, 1977, Reinforced Plastics/Composites Institute, The Society of the Plastics Industry, Inc., Section 7-B, pp. 1-17, reports that:

"A series of sheet molding compound (SMC) formulations based on (1) standard calcium carbonate fillers, (2) developmental 'dry' ground calcium carbonate fillers, (3) blends of standard and developmental 'dry' ground calcium carbonate fillers, and (4) calcium carbonate fillers produced by 'specific classification' production techniques were compounded into paste and SMC prodccts of various types by making changes in the components, conditions and temperature-moisture influences and tabulating the observed changes resulting from varying the herein described variables."

Page 1, "Summary". The Fekete et al article then mentions blends of "Camel Wite" and "Camel Wite 'D'" with "Camel Tex" and "Camel Carb" calcium carbonate fillers, and "specifically classified" fillers, and discusses thickening rates in unsaturated polyester sheet molding resin systems containing such fillers. The filled resins whose viscosities were tested by Fekete et al had calcium carbonate: resin ratios of about 1.5:1, maximum. No particle size characteristics or particle size distributions are given for any of the fillers discussed in the Fekete et al article.

In an earlier article by Fekete referred to in the Fekete et al article: "Influence of Ground Limestone on the Surface Properties of SMC Compositions", proceedings of the 31st Annual Technical Conference, 1976, Reinforced Plastics/Composites Institute, The Society of the Plastics Industry, Inc., Section 7-A, pp. 1-18, particle size characteristics and particle size distributions are listed in Tables XXIV and XXV, p. 18, for "Camel Wite" and "Camel Tex", identified in both the Fekete and Fekete et al articles as "standard", i.e., wet ground, calcium carbonate fillers. And here too the filled resins evaluated by the author had calcium carbonate: resin ratios of about 1.5:1, maximum.

SUMMARY OF THE INVENTION

It has now been discovered that when compositions comprising mixtures of a preponderance of dry ground calcium carbonate with a smaller amount of wet ground calcium carbonate, each of these components having particular particle size characteristics and particle size distributions, are used as all or part of the filler in thermosetting and thermoplastic resinous compositions, high filler loadings at acceptably low viscosities can be obtained.

It is, therefore, an object of this invention to provide novel finely divided particulate calcium carbonate compositions.

It is also an object of this invention to provide novel finely divided particulate calcium carbonate compositions which, when used as all or part of the filler in thermosetting and thermoplastic resinous compositions, provide high filler loadings at acceptably low viscosities.

A further object of this invention is to provide novel finely divided particulate calcium carbonate compositions in which a preponderance of dry ground calcium carbonate is admixed with a smaller amount of wet ground calcium carbonate, each of these components having particular particle size characteristics and particle size distributions. Such compositions, when used as all or part of the filler in thermosetting and thermoplastic resinous compositions, provide properties usually obtainable only by using more expensive processing methods to prepare all-wet ground calcium carbonate filler compositions.

Yet another object of this invention is to provide novel thermosetting and thermoplastic resinous compositions containing, as fillers, these novel finely divided particulate calcium carbonate compositions.

A still further object of this invention is to provide methods of obtaining these novel finely divided particulate calcium carbonate compositions and thermosetting and thermoplastic resinous compositions containing them.

These and other objects, as well as the nature, scope and utilization of the invention, will become readily apparent to those skilled in the art from the following description, the drawings and the appended claims.

DETAILED DESCRIPTION OF THE INVENTION

With regard to particle size characteristics and particle size distribution, the dry ground calcium carbonate should meet the following criteria:

1. Median Particle Size (MPS); the point in the dry ground calcium carbonate's particle size distribution, as shown, for example, on a SediGraph particle size distribution curve representing this component, at which 50% of the mass of all the particles present is larger and 50% of the mass of all particles present is smaller, sometimes referred to as the mean particle size ("$D_{50}$"), will range from about 5 $\mu$m to about 30 $\mu$m, and preferably from about 7 $\mu$m to about 20 $\mu$m, in equivalent spherical diameter.

The SediGraph particle size analyzer is made by Micromeritics Instrument Corporation, Norcross, Ga. It measures settling rate to determine particle size distribution by application of Stokes Law.

2. Particle Size Distribution (PSD) in the dry ground calcium carbonate, also determined in all cases by the SediGraph particle size analyzer, will be such that:

a. No more than about 10 weight percent, and preferably no more than about 1 weight percent, of the particles present are greater than about 80 $\mu$m in equivalent spherical diameter. This is referred to as the "top particle size", or TPS.

b. At least about 10 weight percent, and preferably at least about 25 weight percent, of the particles present are less than about 10 $\mu$m in equivalent spherical diameter.

c. At least about 5 weight percent, and preferably at least about 10 weight percent, of the particles present are less than about 5 $\mu$m in equivalent spherical diameter.

Dry ground calcium carbonate compositions meeting these criteria can be prepared by conventional grinding and classifying techniques, e.g., jaw crushing followed by roller milling or hammer milling and air classifying. Such production techniques and equipment for carrying them out are described in detail in, for example, Perry, J. H., "Chemical Engineers' Handbook" (New York: McGraw-Hill, 1975) and Riegel, E. R., "Industrial Chemistry" (New York: Van Nostrand Reinhold, 1975).

The wet ground calcium carbonate should meet the following criteria:

1. MPS will be no less than about 0.6 $\mu$m and no more than about 2.0 $\mu$m in equivalent spherical diameter.

2. The size in microns of the particles at the 80% point ("$D_{80}$") on the SediGraph particle size distribution curve divided by the size in microns of the mineral particles at the 50% point on the curve, or "$D_{80}/D_{50}$", must give a number not less than about 1.3 and no more than about 2.8. $D_{80}/D_{50}$ is an indication of the breadth or slope of the particle size distribution curve. For example, a monodisperse sample would have a $D_{80}/D_{50}$ =1.0. As the particle size distribution broadens, $D_{80}/D_{50}$ will become larger.

3. The size in microns of the particles at the 20% point ("$D_{20}$") on the SediGraph particle size distribution curve must be no less than about 0.2 $\mu$m and no more than about 1.5 $\mu$m in equivalent spherical diameter. $D_{20}$ is an estimate of the fines in the calcium carbonate composition.

4. PSD will be such that:

a. No more than about 2 weight percent of the particles present are greater (TPS) than about 10 $\mu$m in equivalent spherical diameter.

b. At least about 97 weight percent of the particles present are less than about 7$\mu$m in equivalent spherical diameter.

c. At least about 90 weight percent of the particles present are less than about 5.5 $\mu$m in equivalent spherical diameter.

d. At least about 70 weight percent of the particles present are less than about 3$\mu$m in equivalent spherical diameter.

e. At least about 20 weight percent of the particles present are less than about 1.5 $\mu$m in equivalent spherical diameter.

f. No more than about 40 weight percent of the particles present are less than about 0.4 $\mu$m in equivalent spherical diameter.

The wet ground calcium carbonate can be dispersant free or can, if desired, contain small amounts of conventionally-employed dispersants.

Suitable wet ground calcium carbonate compositions meeting these criteria, and methods for their preparation, are disclosed in commonly assigned U.S. Pat. No. 4,732,748 issued March 22, 1988 in the names of Robert D. Stewart et al. Methods other than those disclosed in the aforementioned Stewart et al patent can also be used to prepare wet ground calcium carbonate having the requisite particle size characteristics and particle size distributions for use in practicing this invention. Included among such other methods are:

wet grinding in a ball mill;

wet grinding in a wet vertical media mill;

wet grinding in a wet horizontal media mill;

wet classification by means of a wet centrifugal classifier;

wet grinding in an autogenous tube mill.

A comminuting and classifying sequence particularly useful in preparing the wet ground component of the novel finely divided particulate calcium carbonate compositions of this invention includes grinding the calcium carbonate in an autogenous mill (first coarse grinding), floating to remove impurities, fine wet grinding in a horizontal micromedia mill, and centrifugal wet classification to remove oversize particles and return them to the wet micromedia mill for further grinding.

In blends of these dry ground and wet ground calcium carbonate compositions used as fillers for thermosetting and thermoplastic resins, at least about 50%, and preferably from about 75% to about 95%, of the mass of all particles present will be dry ground calcium carbonate, with the remainder of the mixture being wet ground calcium carbonate. Typical ratios of weight percents of these two substances include about 50:50, 75:25, 90:10 and 95:5, dry ground:wet ground calcium carbonate.

The novel finely divided calcium carbonate mixtures of this invention are particularly suitable as fillers for reactive or thermosetting polyester resins obtained by reacting polycarboxylic acids, or their anhydrides, with polyhydric alcohols, at least one of these reactants being one which contains $\alpha, \beta$-ethylenic unsaturation, to produce water-insoluble, resinous, essentially linear esterification or condensation products containing a plurality of ethylenically unsaturated linkages distributed along the backbones of their polymer chains. Such resins can be formulated into bulk molding compounds (BMC), sheet molding compounds (SMC), glass filled molding compounds (MC), glass filled molding compounds in which the glass is present as rovings in a X-pattern (XMC), thick molding compounds (TMC), pultrusion resins, and the like, as well as into pastes for coatings, including paints and other finishes, sealants, and the like.

The use $\alpha, \beta$-ethylenically unsaturated polycarboxylic acids provides a convenient method of introducing ethylenic unsaturation into reactive polyester resins. $\alpha, \beta$-Ethylenically unsaturated discarboxylic acids, such as maleic, fumaric, monochloro- and monobromomaleic, monochloro- and monobromofumaric, citraconic, $\gamma, \gamma$-dimethylcitraconic, mesaconic, itaconic, $\alpha$-methylitaconic, $\gamma$-methylitaconic, teraconic, and the like, as well as mixtures thereof, can be used alone or together with minor amounts of $\alpha, \beta$-ethylenically unsaturated polycarboxylic acids contain three or more carboxyl groups, such as aconitic acid and the like.

Non-polymerizable polycarboxylic acids, i.e., acids which are saturated or which contain only benzenoid unsaturation, such as oxalic, malonic, succinic, monochloro- and monobromomalonic, $\alpha, \beta$-dichloro- and -dibromosuccinic, glutaric, adipic, pimelic, suberic, azelaic, sebacic, malic, tartaric, tricarballylic, citric, phthalic, isophthalic, terephthalic, cyclohexanedicarboxylic, endomethylenetetrahydrophthalic, hexachloroendomethylenetetrahydrophthalic, and the like, as well as mixtures thereof, may also be employed, if used in combination with one or more of the aforementioned $\alpha, \beta$-ethylenically unsaturated polycarboxylic acids. The use of non-polymerizable polycarboxylic acids is oftentimes desirable, since acids of this type can impart many beneficial properties to the thermoset resins not obtainable using one or more $\alpha, \beta$-ethylenically unsaturated polycarboxylic acids alone. Such nonpolymerizable polycarboxylic acids, when employed, should constitute at least about 20% but not more than about 80% of the total equivalents of carboxyl groups present in the esterification mixture. Preferably, such non-polymerizable polycarboxylic acids will be employed in amounts ranging from about 25% to about 75% of the total equivalents of carboxyl groups present in the esterification mixture.

Whenever available, the anhydrides of any of the aforementioned $\alpha, \beta$-ethylenically unsaturated polycarboxylic acids and non-polymerizable polycarboxylic acids may be substituted for the acids in whole or in part.

Any of a large class of polyhydric alcohols may be used in preparing reactive polyester resins. While dihydric alcohols, and especially saturated aliphatic diols, are preferred as coreactants, small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5 hexanediol-1,6, neopentyl glycol, and the like, as well as mixtures thereof. Among the polyols having more than two hydroxyl groups which may be employed in minor amounts together with the above-mentioned diols are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

The esterification mixtures from which reactive polyester resins are prepared are generally formulated so as to contain a stoichiometric balance between carboxyl and hydroxyl groups. Thus, where a diol and a dicarboxylic acid are employed, they are usually reacted on at least a mol to mol basis. In common commercial practice a small excess of polyol, usually in the range of from about 5% to about 15% excess, is employed. This is done primarily for economic reasons, e.g., to ensure a rapid rate of esterification.

Reactive polyester resins are formed by reacting the particular polycarboxylic acid or acids and polyol or polyols at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an unreactive gas, e.g., carbon dioxide, nitrogen, and the like, through the esterification mixture. The reaction temperature is not critical, thus, the reaction will preferably be carried out at a temperature which usually will be just below the boiling point of the most volatile component of the reaction mixture, generally the polyol. However, temperatures somewhat excess of the boiling point of the most volatile component may be employed if the reaction vessel is equipped with suitable condensing means, such as a steam heated reflux condenser, which will permit water of esterification to escape from the reaction vessel while condensing volatilized reaction components and returning them to the reaction sphere. Similarly, pressures above or below atmospheric pressure may be employed if desired.

The esterification mixture should be sufficiently reacted so as ultimately to produce a reactive polyester resin having an acid number not appreciably more than about 75, preferably an acid number ranging from about 30 to about 50.

Further details pertaining to the preparation of reactive polyester resins are disclosed in U.S. Pat. No. 2,255,313 to Ellis and in U.S. Pat. Nos. 2,443,735–2,443,741, inclusive, to Kropa.

When used to make molding compounds, paints and other finishes, sealants and the like these reactive polyester resin compositions will also contain ethylenically unsaturated crosslinking materials, usually one or more polymerizable, ethylenically unsaturated monomers which have a $CH_2=C<$ group, contain no more than one ether linkage, and preferably having a boiling point, at atmospheric pressure, of at least 60° C. An illustrative but by no means exhaustive listing of such monomers includes styrene; side-chain-substituted styrenes such as α-methylstyrene, α-ethylstyrene, and the like; ring-substituted styrenes such as the ring-substituted alkyl styrenes, e.g., o-methylstyrene, p-ethylstyrene, m-propylstyrene, 2,4-dimethylstyrene, 2,5-diethylstyrene, and the like; alkyl esters of acrylic and methacrylic acid, e.g., methyl, ethyl and butyl acrylate, methyl methacrylate, and the like; vinyl esters of aliphatic and cycloaliphatic hydrocarbon carboxylic acids such as vinyl acetate, vinyl butyrate, vinyl laurate, vinyl cyclohexanoate, and the like; unsaturated nitriles such as acrylonitrile, methacrylonitrile, acrylamide, methacrylamide, and the like; unsaturated ethers such as phenyl vinyl ether and the like; polyglycol diacrylates and diamethacrylates such as polyethylene glycol 400 diacrylate, polyethylene glycol 600 diamethacrylate, and the like; and allyl compounds such as allyl acetate, allyl acrylate, allyl methacrylate, allyl -hydroxyisobutyrate, allyl lactate, diallyl carbonate, diallyl ether, methallyl ethyl ether, diallyl oxalate, diallyl malonate, diallyl succinate, diallyl adipate, diallyl sebacate, diallyl tartrate, diallyl phthalate, diallyl endomethylenetetrahydrophthalate, diallyl mesaconate, diallyl citraconate, triallyl tricarballylate, triallyl trimesate, triallyl citrate, triallyl cyanurate, triallyl phosphate, trimethallyl phosphate, tetraallyl silane, tetraallyl silicate, hexaallyl disiloxane, and the like, as well as mixtures thereof.

These crosslinking materials will ordinarily be employed in amounts ranging from about 20% to about 60% by weight, based on the total weight of polymerizable reactants in the thermosetting resinous composition.

A polymerization catalyst will be present in these reactive polyester resinous compositions at the time of their cure. The types and amounts of these catalytic materials which may be used are well known in the art, and any material which normally induces polymerization of conventional polyester resinous compositions can be utilized. The optimum curing conditions are modified to some extent by the choice of the particular catalyst, and the amount thereof, to be used. A very active catalyst should be used in lower concentrations, and preferably at lower temperatures, than a less reactive material, but in general, the amount of polymerization catalyst, e.g., an organic peroxide, that will be employed will generally range from about 0.5% to about 2% by weight, based on the total weight of polymerizable reactants present in the thermosetting polyester resinous composition. The preferred catalysts comprise a wide variety of organic peroxides ("acidic peroxides") and hydroperoxides ("alcoholic peroxides") which are generically described as organic superoxides. Among the organic peroxide catalysts that may be employed are acetyl peroxide, benzoyl peroxide, substituted benzoyl peroxides, and particularly halogenated benzoyl peroxides such as p-bromobenzoyl peroxide and 2,4dichlorobenzoyl peroxide, benzoyl acetyl peroxide, phthalyl peroxide, succinyl peroxide, fatty oil acid peroxides, such as coconut oil peroxide, lauryl peroxide, stearyl peroxide, oleyl peroxide, anisoyl peroxide, toluyl peroxide, and the like. Organic peracids, such as peracetic acid and perbenzoic acid, and esterified peracids, such as t-butylperbenzoate, may also be employed. Among the organic hydroperoxide catalysts that may be employed are tertiary butyl hydroperoxide, cumene hydroperoxide, diisopropyl benzene hydroperoxide, 1-hydroxycyclohexyl hydroperoxide, the terpene oxides, such as ascaridole and 1-pmenthane hydroperoxide, and the like. Mixtures of peroxides and hydroperoxides, including commercially available mixtures such as methyl ethyl ketone peroxide, cyclohexane peroxide, and the like, are especially effective as catalysts. Other types of polymerization catalysts may also be employed, for example, compounds such as aluminum chloride, stannic chloride, boron trifluoride, or the azo-type catalysts such as α,α'-azobisisobutyronitrile.

Since the reactive components of these thermosetting polyester resinous compositions contain a high degree of polymerizable unsaturation, it is often desirable to incorporate a polymerization inhibitor therewith. The inhibitor, i.e., a material which will impart some measure of stability to the polymerizable mixture during any storage period prior to curing and yet not affect the polymerization reaction once it has been initiated by the addition of catalyst or by heating, will ordinarily be employed in amounts ranging from about 0.005% to about 0.1% by weight, based on the total weight of polymerizable, reactive components present in the thermosetting polyester resinous composition. Among the inhibitors that may be used are such materials as phenol, the monoalkyl phenols, such as ortho-, meta- and para-cresol, as well as mixtures of such isomers, polyalkyl phenols having a plurality of the same or different substituents, e.g., ethyl, propyl, butyl and higher alkyl radicals, attached to their nuclei, catechol, tertiary butyl catechol, hydroquinone, tertiary butyl hydroquinone, resorcinol, eugenol, guaiacol, pyrogallol, benzaldehyde, tannic acid, ascorbic acid, isoascorbic acid, phenylene diamine, sym di-β-naphthyl-p-phenylene diamine, aniline, and the like. The inhibitor is generally incorporated into the reactive polyester resinous composition at the time the reactive polyester resin is dissolved in the monomeric crosslinking material. However, the inhibitor, and particularly inhibitors such as hydroquinone and tertiary butyl catechol, may also advantageously be present during the preparation of the reactive polyester resin itself.

The curing conditions necessary to advance these thermosetting polyester resinous compositions to the thermoset state generally involve the use of temperatures ranging from about 50° F. to about 260° F., or even higher, with the composition being either in contact with air or enclosed in a laminating assembly, mold, or the like, as long as the temperature is held below the point at which the composition being cured begins to decompose. Molding compositions containing these catalyzed, resin-forming masses will be cured, for example, by heating them in enclosed molds or presses for periods of time ranging from about 2 minutes to about 20 hours.

Thermosetting epoxy resins, e.g., bisphenol A-epichlorohydrin-derived epoxy resins, phenolic resins, e.g., phenol formaldehyde resins, and the like, as well as blends of such thermosetting resins with thermoplastic resins, e.g., blends of thermosetting polyester resins with polyacrylates, polystyrenes, vinyl acetate polymers and the like, can also be filled with the novel, finely divided mineral mixtures of this invention, as can thermoplastic resins such as polyethylene, polypropylene and polyethylene/polypropylene blends, polyesters such as polyethylene terephthalate, poly(1,4-butanediol)terephthalate, and the like, all-aromatic polyesters, e.g., aromatic diacid/aromatic diol/±hydroxy aromatic acid copolymers, polycarbonates, polyoxymethylene homo- and copolymers, e.g., acid anhydride end-capped oxymethylene homopolymers and trioxane/ethylene oxide copolymers, ABS, SBR, EPDM and neoprene rubbers, polyisoprene, and the like.

Advantages are realized from this invention in thermosetting polyester resin molding compositions at higher calcium carbonate filler loadings, where particle packing becomes a significant factor in determining mix viscosity, and primarily when the weight ratio of calcium carbonate to resin is in the range of from about 1.75:1 to about 6.00:1. Yet, at these high loading levels the resulting filled resinous compositions will have sufficiently low viscosities to make them particularly suitable for typical molding applications for which filled thermosetting polyester resins have heretofore been used, such as the manufacture of microwaveable dishes and trays.

Other molded articles which can be made from thermosetting polyester resins filled with the novel finely divided calcium carbonate mixtures of this invention include auto body parts, appliance and computer housings, recreational devices, and the like. These novel filler mixtures can also be used in paints and other finishes, sealants, gel coats, and the like and, as mentioned above, in other thermosetting resinous compositions, including epoxies, phenolics and polyurethanes, and thermoplastic molding compositions, including vinyl polymers and particularly polyolefins, e.g., polyethylene and polypropylene, plastisols and other PVC compounds, and the like. Filler loadings of these novel finely divided calcium mineral mixtures can be as high as about 85% by weight, based on the total weight of resin and finely divided calcium carbonate filler mixture.

Other known additives, such as ultraviolet light-absorbing compounds, non-particulate fillers, and particularly glass fibers, either in woven form as glass cloth, for example, or in the form of discrete fibers, e.g., staple length fibers or glass rovings, other reinforcing fillers, such as talc, alumina, mica, silica, wollostonite, and the like, thickening agents, e.g., metallic oxides and hydroxides such as magnesium oxide, magnesium hydroxide, calcium oxide, calcium hydroxide, and the like, mixtures thereof, and dispersions of such thickeners in inert polymeric vehicles, catalyst promoters, mold lubricants, e.g., metallic stearates such as lithium, magnesium, calcium, aluminum or zinc sterate, fatty acids, fatty acid amides and esters and hydrocarbon waxes, and the like, flow promoters, pigments, dyes, and the like can also be present in conventional amounts in thermosetting and thermoplastic resinous compositions filled with the novel finely divided calcium carbonate mixtures of the invention, so long as their added presence does not render the viscosities of such compositions unacceptably high for their intended applications.

The novel finely divided calcium carbonate filler mixtures of this invention, and any other additives used with them, can be incorporated into thermosetting and thermoplastic resinous compositions by any mixing method conventionally used to prepare mixtures having the viscosities such compositions customarily exhibit. Such mixing devices include high speed impeller mixers, ball mills, roller mills, Banbury mixers, plow mixers, and the like.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

EXAMPLE I

A. Preparation of Dry Ground Calcium Carbonate

Figure 1:
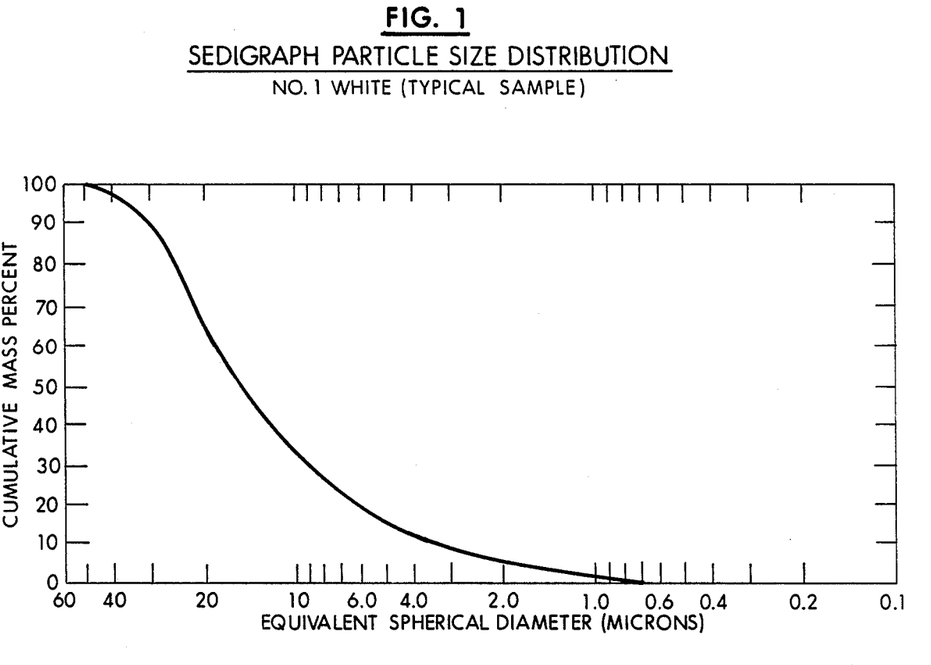
FIG. 1 is a typical SediGraph particle size distribution curve for the dry ground calcium carbonate particulate mass prepared as in Example IA hereinbelow.

A dry ground calcium carbonate having the PSD of the dry ground material represented by the SediGraph particle size distribution curve of FIG. 1 was prepared by first jaw crushing quarried calcium carbonate, then hammer milling the crushed material to approximately minus ½ inch size pieces, and finally milling the hammer milled material in a Raymond roller mill containing a whizzer (an internal vane type classifer) to the final particle size distribution.

B. Preparation of Wet Ground Calcium Carbonate

Limestone was crushed in a jaw crusher to minus 3-½ in. particle size. This material was then screened to remove particles smaller than ½ inch.

The minus 3-½ inch, plus ½ inch screened material was autogeneously wet ground at 30% solids in a 500 horsepower 7 foot diameter by 26 foot long tube mill to a particle size of 95 percent minus 200 mesh. This slurry was then treated with an amine flotation reagent in an amount of approximately ¼ lb./ton of solids in the slurry (this amount can vary slightly depending on the amount and type of (1) the flotation reagent chosen and (2) the impurities present in the limestone starting material), and beneficiated by flotation to remove silica and silicate impurities.

Following flotation the slurry was passed through a Townley Hydroclone wet cyclone to remove particles larger than about 50 microns. The fines discharge from the cyclone was further classified in a 54 inch by 70 inch wet centrifugal classifier manufactured by Bird Machine Co. of South Walpole, Mass. to produce a slurry of particles having a mean particle size of 1.3 microns.

The slurry was transferred to a bowl thickener and 0.1 pound of an anionic flocculating agent was added to the slurry for each ton of limestone to accelerate settling of the solids to a solids concentration of 41.7%.

A 3 gram sample, on a dry basis, of the settled solids was dispersed in water to give 100 ml of slurry, using 2 ml of 1% Colloid 230 solution, an anionic dispersing agent and the particle size distribution was measured with a SediGraph particle size analyzer, Model 5000D.

Figure 2:
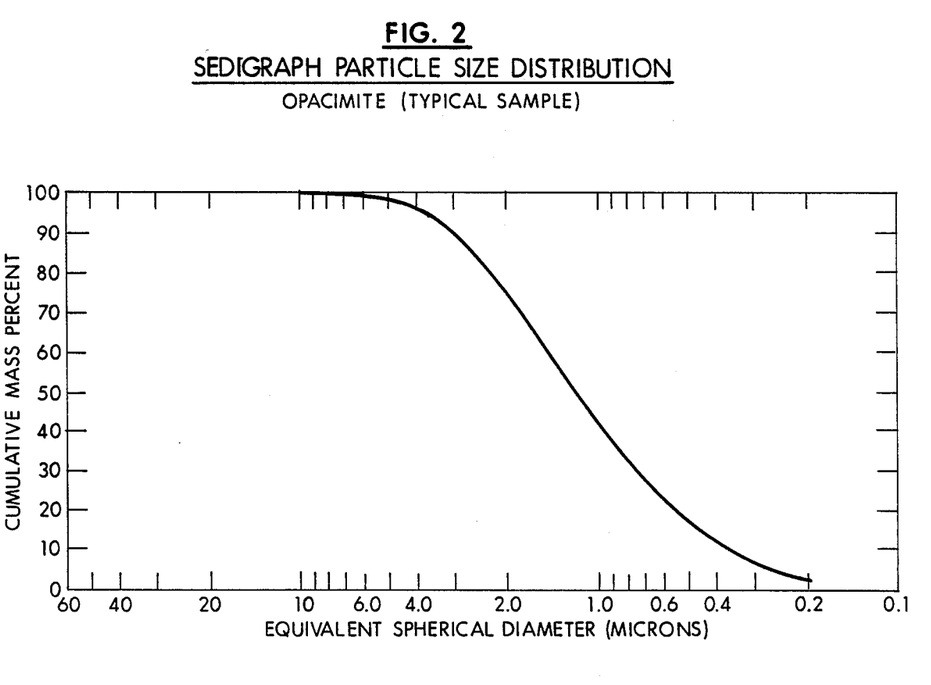
FIG. 2 is a typical SediGraph particle size distribution curve for the wet ground calcium carbonate particulate mass prepared as described in Example IB hereinbelow.
Figure 3:
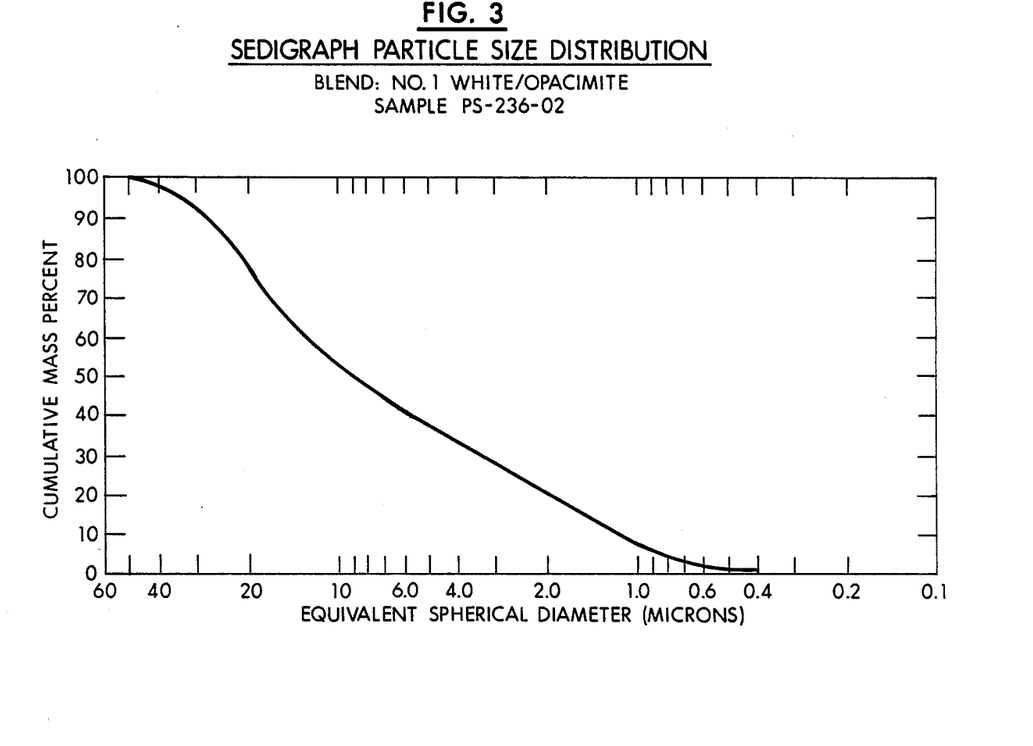
FIG. 3 is a typical SediGraph particle size distribution curve for the blend of dry ground calcium carbonate and wet ground calcium carbonate prepared as described in Example II hereinbelow.
Figure 4:
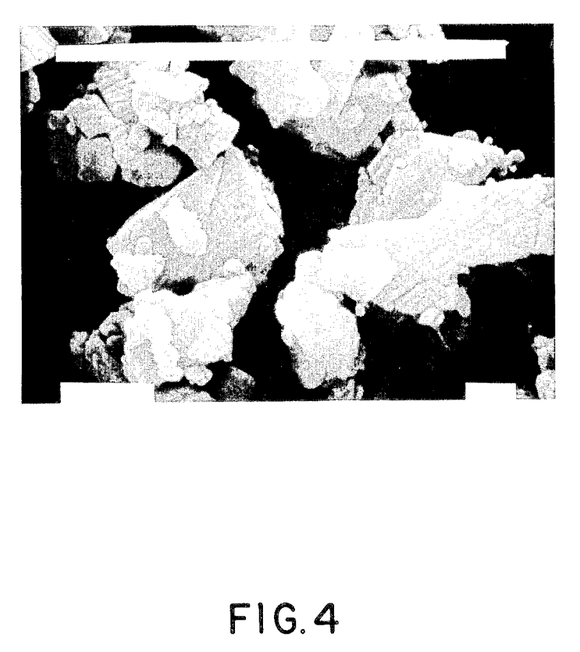
FIG. 4 is a reproduction of a photomicrograph (10,000×magnification) of a typical dry ground calcium carbonate particulate mass prepared as described in Example IA hereinbelow.
Figure 5:
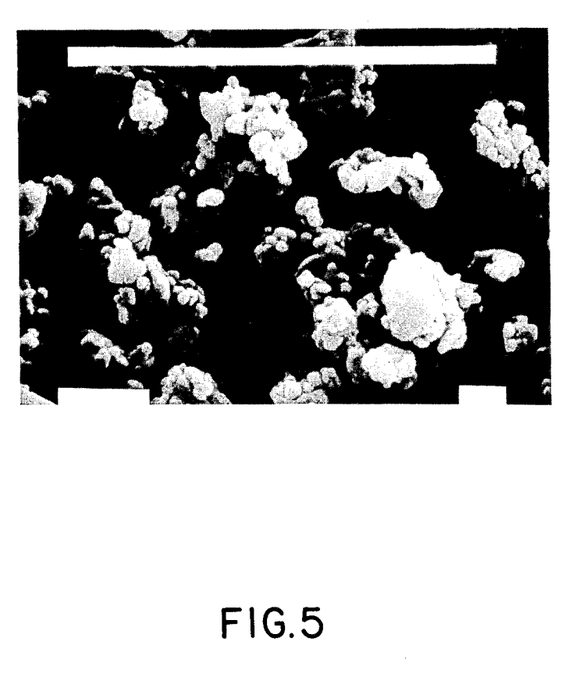
FIG. 5 is a reproduction of a photomicrograph (10,000×magnification) of a typical wet ground calcium carbonate particulate mass prepared as described in Example 1B hereinbelow.

A typical SediGraph particle size distribution curve obtained for this composition is attached as FIG. 2.

The $D_{50}$, $D_{80}/D_{50}$, $D_{20}$ and particle size distribution values for this calcium carbonate composition were found to be as follows: $D_{50}$, 1.17 μm; $D_{80}/D_{50}$, 1.95; $D_{20}$, 0.54 μm.

Particle Size Distribution

About 4 wt. % particles larger than about 4 μm; at least about 85 wt. % particles smaller than about 2.6 μm; at least about 75 wt. % particles smaller than about 2 μm; at least about 60 wt. % particles smaller than about 1.5 μm; at least about 50 wt. % particles smaller than about 1.2 μm; at least about 30 wt. % particles smaller than about 0.74 μm; about 20 wt. % particles smaller than about 0.54 μm.

EXAMPLES II-V

Three 350 part portions of blends containing 74% of the dry ground calcium carbonate particulate mass prepared as described in Example IA above and 26% of the wet ground calcium carbonate particulate mass were blended in a 120 cu. ft. ribbon blender for 90 minutes. The filler blend and a control composition containing only 350 parts of Snowflake PE wet ground calcium carbonate (Cyprus Industrial Minerals Company) were mixed with four 100 part portions of Owens Corning E4297-0 unsaturated polyester resin using a pneumatic high torque impeller mixer at a speed of approximately 450 rpm. The unsaturated polyester resin contained no other ingredients (crosslinking agents, polymerization inhibitors, catalysts, etc.) to permit ease of comparison. The resin and filler samples were blended until a mix temperature of 90° F. was reached.

The viscosities of the resulting resinous bulk molding compositions were measured at room temperature (about 25° C.) 60 minutes after mixing using a Brookfield Viscometer Model HBTB with a helipath attachment and a Type E and T-bar spindle. The results are given in Table I below.

TABLE I

| Example | Brookfield Viscosity (centipoise × $10^{-6}$) |
|---|---|
| II | 3.08[1] |
| III | 2.90 |
| IV | 3.10 |
| V (control) | 3.80 |

[1] Run carried out 16 days before the other 3 runs.

EXAMPLES VI-VIII

Two 350 part portions of blends containing 74% and 85% of the dry ground calcium carbonate particulate mass prepared as described in Example IA above (Examples VI and VII, respectively) and correspondingly 26% and 15% of the wet ground calcium carbonate particulate mass prepared as described in Example IB above, and a control composition (Example VIII) containing 350 parts of Snowflake PE dry ground calcium carbonate alone, blended using a Bepex Turbulizer at a mixing speed of 1660 rpm and a through-put rate of 1830 to 2470 lbs/hr., were used to fill 100 part samples of Owens Corning E4297-0 unsaturated polyester resin in the manner described in Examples II-V above.

The viscosities of the resulting resinous bulk molding compositions, measured as in Examples II-V 120 minutes after mixing was completed, are given in Table II below.

TABLE II

| Example | Brookfield Viscosity (centipoise × $10^{-6}$) |
|---|---|
| VI | 3.30 |
| VII | 3.70 |
| VIII (Control) | 4.30 |

EXAMPLES IX-XI

A blend containing 74% of the dry ground calcium carbonate particulate mass prepared as described in Example IA above and 26% of the wet ground calcium carbonate particulate mass prepared as described in Example IB above was prepared using a 3 gallon Henschel style blender operated for 1 minute at low speed with room temperature (about 25° C.) water cooling.

350 Part portions of each of the resulting blend (Example IX), the dry ground material alone (Example X) and Snowflake PE calcium carbonate (Example XI) were used to fill 100 part portions of Owens Corning E-4297-0 unsaturated polyester resin in the manner described in Examples II-V above.

The viscosities of the resulting resinous bulk molding compositions, measured as in Examples II-V 90 minutes after mixing was completed, are given in Table III below.

TABLE III

| Example | Brookfield Viscosity (centipoise × $10^{-6}$) |
|---|---|
| IX | 2.80 |
| X | 17.60 |
| XI | 4.10 |

EXAMPLES XII-XV

Blends containing 90%, 85% and 77% of the dry ground calcium carbonate particulate mass prepared as described in Example IA above (Examples XII, XIII and XIV, respectively) and correspondingly 10%, 15 % and 23%, respectively of the wet ground calcium carbonate particulate mass prepared as described in Example IB above were prepared using a Waring blender at low speed for 1.25 minutes.

350 parts of each of the resulting blends and 350 parts of Snowflake PE calcium carbonate were used to fill 100 part portions of Owens Corning E-4297-0 unsaturated polyester resin in the manner described in Examples II-V above.

The viscosities of the resulting resinous bulk molding compositions, measured as in Examples II-V 100 minutes after mixing was completed, are given in Table IV below.

TABLE IV

| Example | Brookfield Viscosity (centipoise × $10^{-6}$) |
|---|---|
| XII | 4.48 |
| XIII | 3.52 |
| XIV | 2.88 |
| XV | 4.24 |

The above discussion of this invention is directed primarily to preferred embodiments and practices thereof. It will be readily apparent to those skilled in the art that further changes and modifications in the actual implementation of the concepts described herein can readily be made without departing from the spirit and scope of the invention as defined by the following claims.

We claim:

1. A synthetic resin composition containing a finely divided particulate composition comprising a mixture of:
   A. Dry ground calcium carbonate wherein the particles present range in median particle size from about 5 μm to about 30 μm in equivalent spherical diameter and whose particle size distribution is such that:
   (a) no more than about 10 weight percent of the particles present are greater than about 80 μm in equivalent spherical diameter;
   (b) at least about 10 weight percent of the particles present are less than about 10 μm in equivalent spherical diameter;
   (c) at least about 5 weight percent of the particles present are less than about 5 μm in equivalent spherical diameter; admixed with
   B. wet ground calcium carbonate having the following characteristics:
   (a) the size of the mineral particles at the 50% point on a SediGraph particle size distribution curve representing the wet ground mineral is from about 0.6 μm to about 2.0 μm in equivalent spherical diameter;
   (b) the size of the mineral particles at the 80% point on said distribution curve divided by the size of the mineral particles at the 50% point on said distribution curve gives a number of from about 1.3 to about 2.8;
   (c) the size of the mineral particles at the 20% point on said distribution curve is from about 0.2 μm to about 1.5 μm in equivalent spherical diameter;
   and the overall sizes of mineral particles present are such that:
   no more than about 2 weight percent of the particles present are larger than about 10 μm in equivalent spherical diameter;
   at least about 97 weight percent of the particles present are less than about 7 μm in equivalent spherical diameter;
   at least about 90 weight percent of the particles present are less than about 5.5 μm in equivalent spherical diameter;
   at least about 70 weight percent of the particles present are less than about 3 μm in equivalent spherical diameter;
   at least about 20 weight percent of the particles present are less than about 1.5 μm in equivalent spherical diameter; and
   no more than about 40 weight percent of the particles present are less than about 0.4 μm in equivalent spherical diameter.

2. A finely divided particulate composition as recited in claim 1 in which at least about 50% of the mass of all particles present is dry ground calcium carbonate.

3. A finely divided particulate composition as recited in claim 1 in which the percent ratio of dry ground calcium carbonate to wet ground calcium carbonate is about 75:25.

4. A finely divided particulate composition as recited in claim 1 in which the percent ratio of dry ground calcium carbonate to wet ground calcium carbonate is about 90:10.

5. A finely divided particulate composition as recited in claim 1 in which the percent ratio of ground calcium carbonate to wet ground calcium carbonate is about 95:5.

6. A finely divided particulate composition as recited in claim 1 in which 50 weight percent of all dry ground particles present ranges from about 7 μm to about 20 μm in equivalent spherical diameter, no more than about 1 weight percent of the dry ground particles present are greater than 80 μm in equivalent spherical diameter, at least about 25 weight percent of the particles present are less than about 10 μm in equivalent spherical diameter and at least about 10 weight percent of the dry ground particles present are less than about 5 μm in equivalent spherical diameter.

7. A resinous composition as recited in claim 7 in which the weight ratio of calcium carbonate to resin ranges from about 1.75:1 to about 6.00:1.

8. A resinous composition as recited in claim 1 in which the resin is a thermosetting polyester resin.

9. A resinous composition as recited in claim 1 in which the resin is an epoxy resin.

10. A resinous composition as recited in claim 1 in which the resin is a phenolic resin.

11. A resinous composition as recited in claim 1 in which the resin is a polyurethane resin.

12. A resinous composition as recited in claim 1 in which the resin is a vinyl resin.

13. A resinous composition as recited in claim 12 in which said vinyl resin is a polyolefin.

14. A resinous composition as recited in claim 12 in which said vinyl resin is polyethylene.

15. A resinous composition as recited in claim 12 in which said vinyl resin is a plastisol.

16. A resinous composition as recited in claim 12 in which said vinyl resin is a PVC resin.

17. A molded article made from a resinous composition as recited in claim 1.

* * * * *

UNITED STATES PATENT AND TRADEMARK OFFICE
CERTIFICATE OF CORRECTION

PATENT NO. : 4,835,195

DATED : May 30, 1989

INVENTOR(S) : Jerry W. Rayfield; Robert A. Baker; and Kenneth E. Weber

It is certified that error appears in the above-identified patent and that said Letters Patent is hereby corrected as shown below:

On the title page, between item [76] and item [21], add:

-- Assignee: ECCA Calcium Products, Inc.
Atlanta, Georgia --

Signed and Sealed this

Twenty-seventh Day of November, 1990

Attest:

HARRY F. MANBECK, JR.

Attesting Officer

Commissioner of Patents and Trademarks